July 1, 1952 G. B. SAYRE 2,601,701
METHOD OF COMPRESSION MOLDING A PLASTIC IN SHEET FORM
Filed April 1, 1949 2 SHEETS—SHEET 1
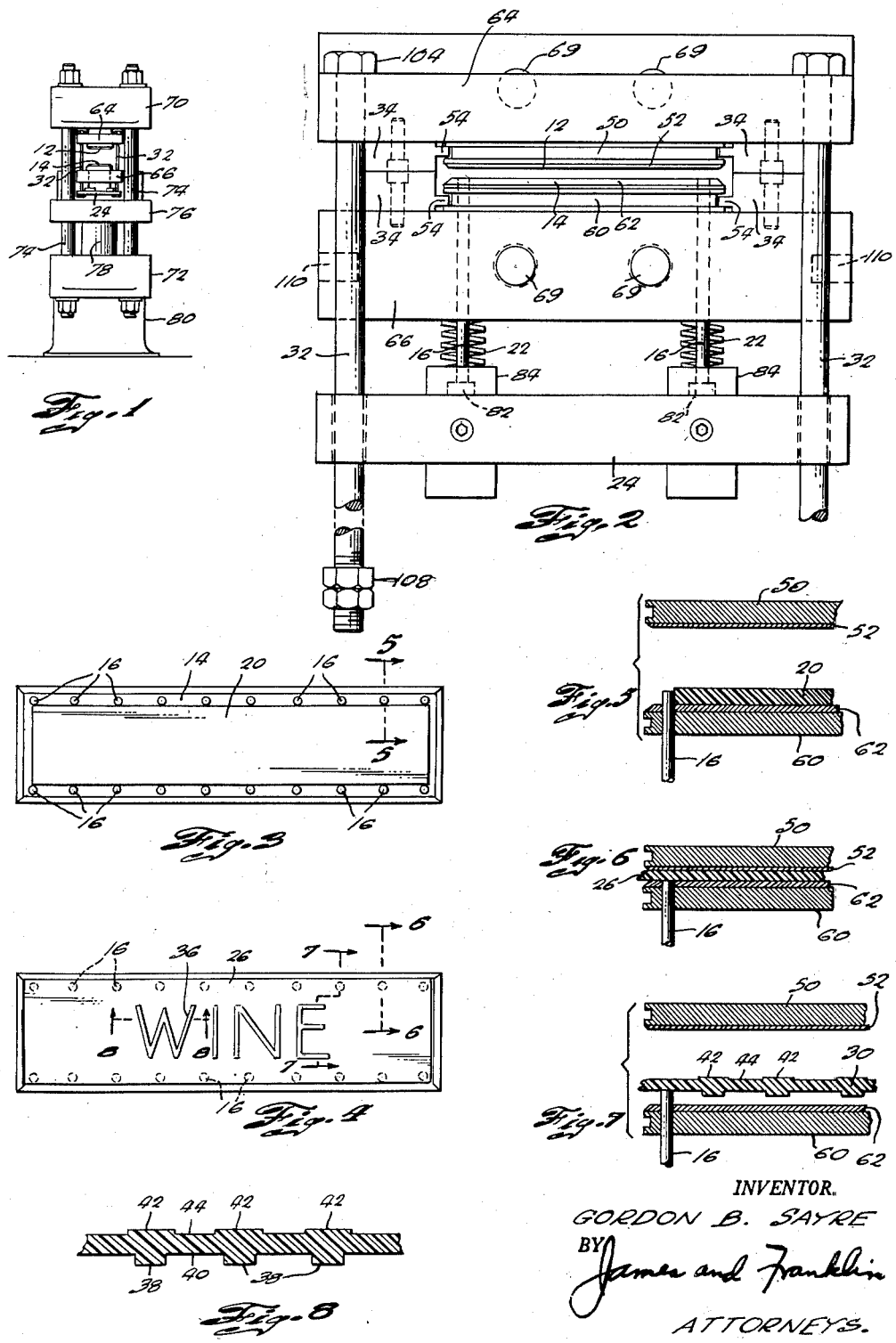
INVENTOR.
GORDON B. SAYRE
BY James and Franklin
ATTORNEYS.

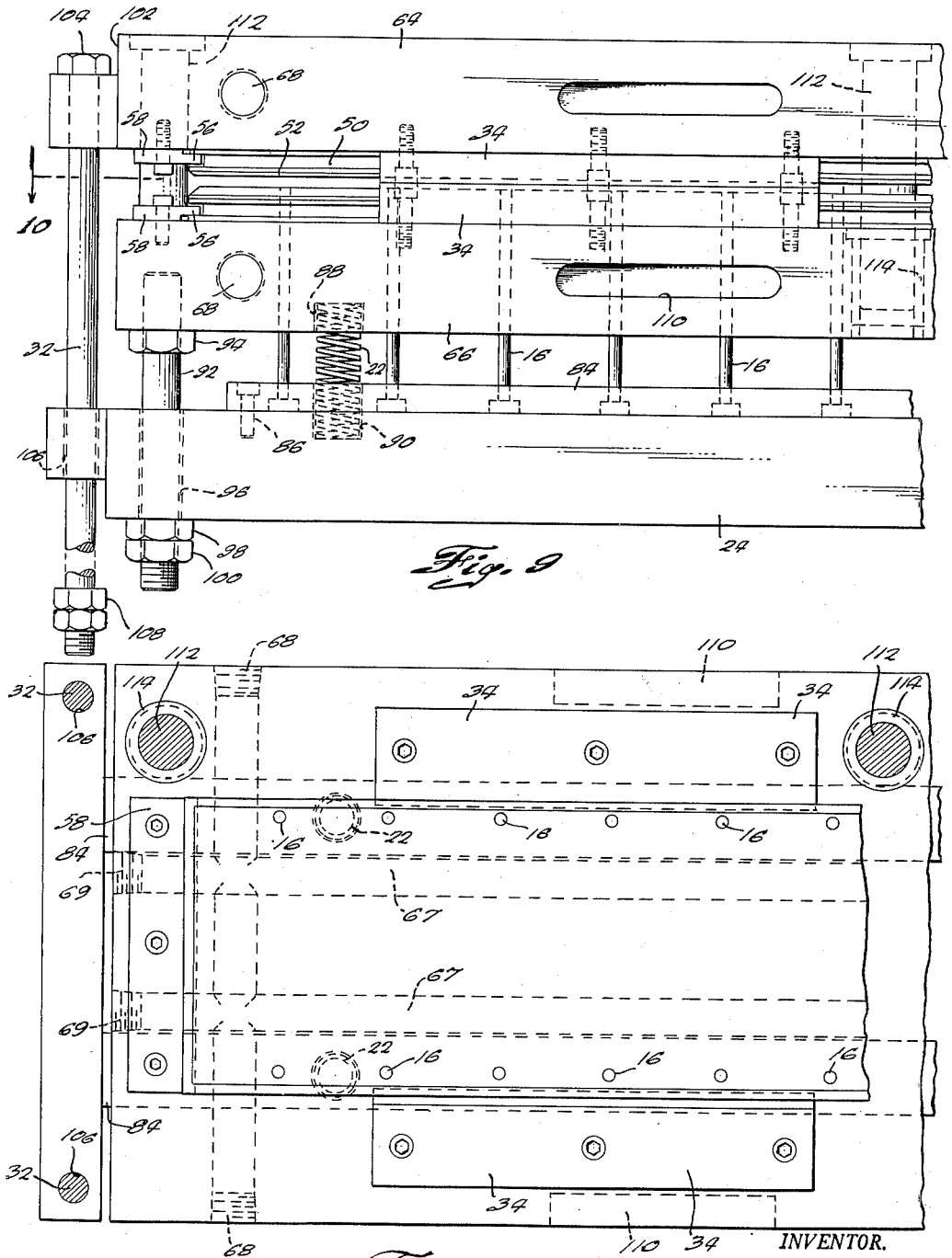

Patented July 1, 1952

2,601,701

UNITED STATES PATENT OFFICE 2,601,701

METHOD OF COMPRESSION MOLDING A PLASTIC IN SHEET FORM

Gordon B. Sayre, Boonton, N. J., assignor to Boonton Molding Company, Boonton, N. J., a corporation of New Jersey Application April 1, 1949, Serial No. 84,874

4 Claims. (Cl. 18—55)

This invention relates to the compression molding of plastics, and more particularly to the compression molding of a plastic in sheet form.

The primary object of the present invention is to generally improve molding methods.

Still another object is to provide an improved method for compression embossing or otherwise modifying the surfaces of a panel of transparent or translucent plastic, said improvement serving to prevent marring of the useful area of the panel by pin marks.

A still further object of the invention is to accomplish the foregoing with simple mechanism, much the same as that required for ordinary molding operations, thereby minimizing the cost of introducing the invention into practical use.

To accomplish the foregoing general objects, and other more specific objects which will hereinafter appear, my invention resides in the method as hereinafter more particularly described in the following specification. The specification is accompanied by drawings in which:

Fig. 1 is an elevation of a typical compression molding press to which the invention may be applied;

Fig. 2 is an end elevation of a mold embodying features of the present invention;

Fig. 3 is a plan view drawn to smaller scale of the lower half of the mold, with a preform in position;

Fig. 4 is a similar view after the molding operation;

Fig. 5 is a fragmentary section taken approximately in the plane of the line 5—5 of Fig. 3;

Fig. 6 is a fragmentary section taken approximately in the plane of the line 6—6 of Fig. 4;

Fig. 7 is a fragmentary section similar to Fig. 6, after ejection;

Fig. 8 is a fragmentary section drawn to enlarged scale through the molded piece, taken approximately in the plane of the line 8—8 of Fig. 4;

Fig. 9 is an elevation of a part of the mold; and

Fig. 10 is a plan view of the lower half of said part of the mold.

Referring to the drawing, and more particularly to Fig. 2, the apparatus comprises an upper mold 12 and a lower mold 14, the latter having vertically movable pins 16. Referring now to Figs. 3 and 5, the pins 16 project through the lower mold 14 just outside the periphery of a preform 20, so that the pins 16 may be used as locater pins when loading the preform 20 into the mold. The apparatus includes means to withdraw the locater pins 16 as the mold closes and before the mold is fully closed. In the present case the said means are the compression springs 22 (Figs. 2 and 9). These springs urge plate 24 downward, the said plate carrying the pins 16.

When the mold is closed the preform is compressed and the material is spread over the ends of the pin 16, as best shown at 26 in Figs. 4 and 6. When the mold opens the pins are again projected through the mold and thus act as ejector pins to eject the finished molded piece 30, as is best shown in Fig. 7. The means for this purpose is here exemplified by lost motion pull rods 32 (Figs. 2 and 9).

In the apparatus here shown the upper and lower molds are generally flat molds, and the preform is a piece of flat sheet stock of predetermined dimension. The mold is open entirely around its periphery, and the thickness of the finished molded piece is determined by the use of spacer blocks which limit the closing of the mold. These spacer blocks are shown at 34 in Figs. 2, 9, and 10.

The particular problem being handled is to emboss or otherwise modify one or both faces of a piece of transparent or translucent sheet plastic, to be used as an illuminated panel. One example is the formation of illuminated signs for advertising purposes. This is suggested in Fig. 4 by the lettering 36, the word "wine" being selected at random. The illuminated panel has a predetermined useful area, and in accordance with one feature of the present invention, the pins 16 are located outside that area, thus preventing the panel from being marred by inevitable pin marks.

The usual practice is to dimension the initial blank of flat sheet plastic the same as the desired illuminated panel. In that case the pins 16 may be located immediately outside the blank, thus accurately locating the same with relation to the lettering. The pins are withdrawn during the molding operation, and the material when compressed is spread over the pins, thereby permitting the same pins to be used as ejector pins later when the mold is opened. The pin marks then are necessarily located outside the desired useful area of the panel.

Referring to Fig. 8, the particular sign here being molded has embossed or raised lettering indicated by the projections 38 below the front surface 40 of the molded piece. The letters are embossed on both sides, as is indicated by the projections 42 above the back surface 44 of the molded piece. For the purposes of the particular type of sign here being molded the rear projections 42 are slightly larger in area than the projections 38, and are considerably less in thickness. The projections 38 are at the front of the sign, and the projections 42 are at the rear, but the sign is molded with the thicker lettering downward in order to locate the same in the ejection half of the mold.

Considering the apparatus in greater detail, the upper mold 12 is made up of a hardened steel plate 50 having a polished bottom surface. A thin plate 52 is secured to plate 50. The plate 52 has the desired lettering cut therethrough, somewhat as in a stencil. The plate 52 has a thickness equal to the desired elevation of the projections 42 shown in Fig. 8. If different signs are to be made, each having a comparatively small run, the plate 52 is preferably made of brass or other readily worked material. However, if a very large number of one particular sign is needed, the plate 52 may, if desired, be made of steel instead of brass. The peripheral edges of the steel plate 50 may be grooved or rabbetted to receive holding tongues 54 (Fig. 2) which, in this case, are formed on the spaced blocks 34. Referring to Fig. 9, it will be seen that additional holding tongues 56 may be formed on blocks 58 which are used solely for holding purposes, in contrast with the blocks 34 which are used also as spacer blocks.

Reverting to Fig. 2, the lower mold is made up of a steel plate 60, with an additional plate 62 secured thereto. The steel plate has a polished top surface which forms the face of the lettering, and the plate 62 has the lettering cut therethrough, as previously described for the plate 52. However, the plate 62 has a greater thickness corresponding to the desired projection of the lettering indicated at 38 in Fig. 8. In a typical case the plate 52 may have a thickness of, say, $\frac{1}{16}''$, and the plate 62 a thickness of, say, $\frac{1}{4}''$.

As before, the steel plate 60 is preferably grooved or rabbetted entirely around its periphery to receive holding tongues 54 (Fig. 2) on spacer blocks 34, as well as additional holding tongues 56 (Fig. 9) on holding blocks 58.

The steel plates 50 and 60 are secured to heated mold plates 64 and 66, respectively. Connections for steam pipes are indicated at 68 in Figs. 9 and 10. Steam passages are indicated at 67, the ends being plugged at 69. It will be understood that heat from the mold plates 64 and 66 is conducted to the steel plates 50 and 60, and to the brass lettering plates 52 and 62, so that the sheet of plastic is subjected to heat as well as pressure during the molding operation.

The mold plate 64 corresponds to the cover half of an ordinary mold, and may be secured directly to the top or stationary head of a conventional molding press. Such a press is more or less schematically shown in Fig. 1, it comprising a stationary upper head 70 secured to a stationary lower head 72 by means of tie rods 74. A movable head or platen 76 slides vertically on the tie rods 74. It is moved upward by a large diameter plunger or ram 78 slidable in a cylinder formed in the base 80 of the press. The head 76 is lowered to open the mold for the removal of a molded piece, and for the insertion of a new preform or blank sheet of plastic. The head 76 then is raised to mold the blank against the upper mold portion secured to the upper head 70.

The lower portion of the mold is somewhat more complex because it is the ejector portion, and provision must be made for movement of the locater-ejector plate 24 which carries the locater-ejector pins 16 previously referred to.

In Fig. 2 it will be seen that the pins 16 are upset to form heads 82 at their lower ends, the said heads being held between bars 84 and the plate 24. This may be done in accordance with conventional mold practice. In the present case where there are simply two long lines of pins, as is best shown in Figs. 3 and 4, the holding parts 84 may be relatively long bars, as will be seen from comparison of Figs. 9 and 10. The said bars may be secured to the plate 24 by means of screws, one of which is shown at 86 in Fig. 9. The compression springs 22 simply urge the plate 24 downward. It is convenient and efficient to locate these springs at the bars 84, as is clearly shown in the drawing. The bottom of the heated mold plate 66 may be recessed somewhat as shown at 88 (Fig. 9) to receive the upper ends of the springs, and the bars 84, and if desired a part of the upper surface of the plate 24, may be recessed as shown at 90, to receive the lower ends of the springs.

The maximum spacing between the heated mold plate 66 and the locater-ejector pin plate 24 is limited by means of suitable stop rods, one of which is clearly shown at 92 in Fig. 9. The upper end of rod 92 is threaded and screwed into the heated mold plate 66. A nut 94 may be used as a lock nut to guard against loosening of the rod. The lower portion of rod 92 slides freely through a hole 96 in the plate 24. A nut 98 limits the downward movement of plate 24, and is properly adjusted to bring the upper ends of the pins 16 flush with the top face of the mold. Another nut 100 is jammed against the nut 98 to lock it against movement.

The lost motion pull rods 32 have already been mentioned. The upper heated mold plate 64 is rabbetted at 102 to provide clearance for the heads 104 of pull rods 32. The lower portion of each pull rod is slidable in a hole 106. Locked nuts 108 are suitably adjusted for the desired ejection action. More specifically, nuts 108 are located so far down on rod 32 as to permit the desired opening of the mold. On the one hand this opening should be made adequate to facilitate ready removal of the molded piece, and ready insertion of a new blank of material. On the other hand it is customary not to make the opening of the mold excessive, because of the excess mold-opening and mold-closing time which would be lost, and because of the waste of hydraulic fluid needed to operate the press. In any event it will be understood that when the desired opening is nearly reached, the nuts 108 reach the locater-ejector plate 24, and continued opening of the mold raises the plate 24, thereby raising the pins, and so freeing the piece from the lower mold, as is indicated in Fig. 7 of the drawing.

The upper and lower mold portions are held in exact alignment by a series of appropriate pilots. Two of these pilots are shown in Figs. 9 and 10, the hardened steel pilots 112 being secured to the upper mold portion and fitting slidably in hardened steel bushings 114 in the lower mold portion. In the particular mold here shown the pilots have been located along one only of the longer sides of the mold, thereby leaving the opposite long side open for easy access. Because the panel being molded is quite long compared to its width, it is found easier and more convenient to insert and remove the same transversely rather than longitudinally. The upper and lower mold portions together form a mold which is unusual in being open entirely around its periphery, the spacing therebetween when the mold is closed being determined by the spacer blocks previously referred to.

Reverting to Figs. 2, 9, and 10, attention is called to the recesses 110. These are adapted to receive holding parts preferably forming part of a complete ejector mold frame or box which in turn mounts the heated mold plate 66 fixedly on the movable platen 76 of the press. This may be done in accordance with conventional practice in the molding art, and is indicated by the supports at 112 in Fig. 1 which extend down from the lower mold portion 66 to the movable platen 76 of the press.

It is believed that the construction and operation, as well as the method of use and advantages, of my improved apparatus for molding sheet stock or similar preforms will be apparent from the foregoing detailed description. The mold is provided with one set of pins, which, however, serve two purposes. When the mold is open the pins in raised position are so positioned as to act as locater pins to properly and accurately locate the blank or sheet of plastic in proper position. As the mold is closed, the pins are withdrawn preparatory to acting as ejector pins. The operation of the mold on the blank causes spreading of the material out over the ends of the withdrawn pins. Then when the mold is opened the pins are raised, and act as ejector pins to free the molded piece from the lower portion of the mold. The desired or useful area of the molded panel comes within the pins, and is preferably the same as the initial area of the blank. Thus any marring of the finished panel by the ejector pins comes outside the useful area of the panel, that is, the area which is to be exposed in the finished product. For example, in the case of a sign the transparent or translucent panel may in many cases be framed about its periphery, and in such case the presence of pin marks on that peripheral portion which is hidden by the frame, would be of no consequence. However, the illuminated central or exposed area is devoid of pin marks. The apparatus required to practice the invention is comparatively simple. Indeed it is no more complex than the apparatus which would be needed for ordinary compression molding, even without the improvements here disclosed.

It will be apparent that while I have shown and described my invention in a preferred form, changes may be made in the structure disclosed without departing from the scope of the invention, as sought to be defined in the following claims. In the claims the term "transparent" is employed for convenience, and is intended to include translucent or colored plastics, as well as truly transparent plastics. The reference to the mold as being "flat" is intended to mean that the base is very extensive in area compared to its thickness, and is not intended to exclude the molding of a panel or sign which has a somewhat dished or concavo-convex shape or other shape which nevertheless presents the same general working conditions and problems as have been set forth in the examples shown.

I claim:

1. In compression molding of a piece of flat sheet stock of predetermined dimension, the method of making it possible to use the ejector pins of the mold as locating pins for the piece of flat sheet stock of predetermined dimension which method includes locating all of the ejector pins outside the edges of an area corresponding to the area of said piece, raising the ejector pins, inserting the piece of flat sheet stock within the confines of the raised pins, retracting the pins and closing the mold to compress and spread the material enough to cause it to overlie the ends of the retracted pins.

2. In compression molding of a piece of flat sheet plastic to be used as an illuminating panel, the method of eliminating ejector pin marks which would mar the useful working area of the panel which method includes locating all of the ejector pins outside the edges of an area corresponding to the useful area of the panel, inserting the sheet plastic within the area defined by the pins, closing the mold and compressing the sheet plastic to spread the material enough to cause it to overlie the ends of the pins.

3. In compression molding of a piece of flat sheet stock of predetermined dimension in apparatus which is conventional in comprising generally flat plates constituting a mold with an open periphery and having stop blocks and ejector pins, the method of making it possible to use the ejector pins of the mold as locating pins for the piece of flat sheet stock of predetermined dimension, which method includes locating all of the ejector pins immediately outside the edges of an area corresponding to the area of said piece of flat sheet stock, raising the ejector pins, inserting the piece of stock within the confines of the raised pins, retracting the pins and closing the mold as far as permitted by the stop blocks in order to compress and spread the material with the edge portions of the spread material overlying the ends of the retracted ejector pins.

4. In compression molding of a piece of flat sheet plastic to be used as an illuminated panel, said plastic being molded by apparatus which is conventional in comprising generally flat plates constituting a mold which is open at the periphery and having stop blocks and ejector pins, the method of eliminating ejector pin marks which would mar the useful working area of the panel, which method includes locating all of the ejector pins immediately outside the edges of an area corresponding to the useful area of the panel, inserting the sheet plastic within the area defined by the pins, closing the mold as far as permitted by the stop blocks, and thereby compressing the sheet plastic to spread the material with the edge portions of the spread material overlying the ends of the pins.

GORDON B. SAYRE.

REFERENCES CITED

The following references are of record in the file of this patent:

UNITED STATES PATENTS

| Number | Name | Date |
| --- | --- | --- |
| 1,919,534 | Shaw | July 25, 1933 |
| 1,951,999 | Sprague | Mar. 20, 1934 |
| 1,971,850 | Ernst | Aug. 28, 1934 |
| 2,015,647 | Martindell | Sept. 24, 1935 |
| 2,298,429 | Smith | Oct. 13, 1942 |
| 2,415,395 | Ulrich | Feb. 4, 1947 |